(12) United States Patent
Leach

(10) Patent No.: US 8,661,588 B1
(45) Date of Patent: Mar. 4, 2014

(54) SLIP COVER FOR CRIB MATTRESS

(76) Inventor: Jamie S. Leach, Ada, OK (US)

( * ) Notice: Subject to any disclaimer, the term of this patent is extended or adjusted under 35 U.S.C. 154(b) by 1169 days.

(21) Appl. No.: 11/946,293

(22) Filed: Nov. 28, 2007

(51) Int. Cl.
 *A47C 21/08* (2006.01)
(52) U.S. Cl.
 USPC ............. 5/655; 5/424; 5/425; 5/482; 5/732
(58) Field of Classification Search
 USPC ............ 5/490, 632–634, 731, 733, 492, 424,
  5/425, 482, 494, 495, 497, 499, 502, 636,
  5/655, 655.9, 717, 732, 739, 946
 See application file for complete search history.

(56) References Cited

U.S. PATENT DOCUMENTS

| | | | |
|---|---|---|---|
| 2,644,173 A | 7/1953 | James | |
| 2,953,793 A | 9/1960 | Rossi | |
| 4,171,549 A | 10/1979 | Morrell et al. | |
| 4,179,158 A | 12/1979 | Flaum et al. | |
| 4,194,254 A | 3/1980 | Torrez | |
| 4,574,412 A | 3/1986 | Smith | |
| 4,607,402 A * | 8/1986 | Pollard | 5/425 |
| 4,670,923 A | 6/1987 | Gabriel et al. | |
| 4,712,258 A | 12/1987 | Eves | |
| 4,754,509 A | 7/1988 | Pollard | |
| 4,788,726 A | 12/1988 | Rafalko | |
| 4,834,459 A | 5/1989 | Leach | |
| 4,861,109 A | 8/1989 | Leach | |
| 4,872,228 A | 10/1989 | Bishop | |
| 4,873,734 A | 10/1989 | Pollard | |
| 4,905,330 A | 3/1990 | Jacobs | |
| D309,018 S | 7/1990 | Leach | |
| 5,103,514 A | 4/1992 | Leach | |
| 5,325,818 A | 7/1994 | Leach | |
| 5,455,973 A | 10/1995 | Brumfield et al. | |
| D377,423 S | 1/1997 | Latrella et al. | |
| 5,765,502 A * | 6/1998 | Haugh | 119/28.5 |
| 5,822,817 A | 10/1998 | Carew et al. | |
| 6,026,525 A | 2/2000 | Davis | |
| 6,079,067 A | 6/2000 | Becker et al. | |
| 6,343,727 B1 | 2/2002 | Leach | |
| 6,351,864 B1 | 3/2002 | Karafa et al. | |
| 6,370,715 B1 * | 4/2002 | Morton | 5/655 |
| 6,427,251 B1 | 8/2002 | Leach | |
| 6,499,164 B1 | 12/2002 | Leach | |
| 6,516,482 B2 | 2/2003 | Karafa et al. | |
| 6,553,590 B1 | 4/2003 | Leach | |
| 6,601,252 B1 | 8/2003 | Leach | |
| 6,668,399 B2 * | 12/2003 | Malstaff et al. | 5/424 |
| 6,751,817 B1 | 6/2004 | Leach | |
| 6,760,934 B1 | 7/2004 | Leach | |
| 6,799,339 B2 * | 10/2004 | Stewart | 5/413 AM |

(Continued)

*Primary Examiner* — Nicholas Polito
(74) *Attorney, Agent, or Firm* — Mary M. Lee

(57) ABSTRACT

A slip cover for a crib mattress. The slip cover preferably comprises a mattress cover with a zippered end through which the crib mattress is easily insertable. Attached to one end of the mattress cover is a bolster, which may comprise a bolster cover and a foam insert. In most applications, the bolster will be generally U-shaped and will comprise an inclined back section and two arms. The slip cover allows continued use of a crib mattress after it is no longer needed in a crib or toddler bed. When placed on a standard crib mattress, the slip cover with its attached bolster forms an ideal portable toddler bed. Alternately, the slip cover converts the mattress into a child-sized chaise lounge ideal for reading or watching television. Still further, the slip-covered mattress may be used as a pet bed, especially for a large breed dog or for multiple smaller dogs.

22 Claims, 3 Drawing Sheets

(56) References Cited

U.S. PATENT DOCUMENTS

| | | |
|---|---|---|
| 7,010,821 B1 | 3/2006 | Leach |
| 7,107,635 B2 | 9/2006 | Henry et al. |
| 7,114,206 B2 | 10/2006 | Leach |
| 7,353,552 B2 | 4/2008 | Leach |
| 2002/0014793 A1 | 2/2002 | Santha |
| 2005/0217030 A1* | 10/2005 | Seigler ............... 5/738 |
| 2005/0278864 A1 | 12/2005 | Leach |
| 2007/0022526 A1 | 2/2007 | Leach |
| 2007/0028384 A1 | 2/2007 | Leach |
| 2007/0046084 A1 | 3/2007 | Leach |
| 2007/0151031 A1 | 7/2007 | Leach |
| 2007/0277321 A1 | 12/2007 | Leach |

* cited by examiner

SLIP COVER FOR CRIB MATTRESS

FIELD OF THE INVENTION

The present invention relates generally to bedding for toddlers and small children.

BACKGROUND OF THE INVENTION

Cribs for infants typically include a crib sized mattress and a frame with safety rails. The crib mattress typically costs at least several hundred dollars and sometimes much more. However, though essential for early child care, the usefulness of the crib mattress is short-lived. Upon reaching about 12-15 months old, toddlers usually graduate to a toddler bed or adult single bed, and the crib mattress is retired. The crib itself may be sold or given to relatives. However, for sanitary reasons, purchasers of used crib frames will usually purchase new crib mattresses. Thus, the expensive crib mattress is outgrown and discarded long before its functional life is exhausted.

In accordance with the present invention, a slip cover with an attached bolster transforms a crib mattress into a portable toddler bed, a chaise lounge for a toddler or small child, or even a bed for household pets, especially large breed dogs. Thus, the inventive slip cover extends the functional life of the crib mattress and provides a new and useful furniture item to the play room or den.

DETAILED DESCRIPTION OF THE PREFERRED EMBODIMENTS

Figure 1:
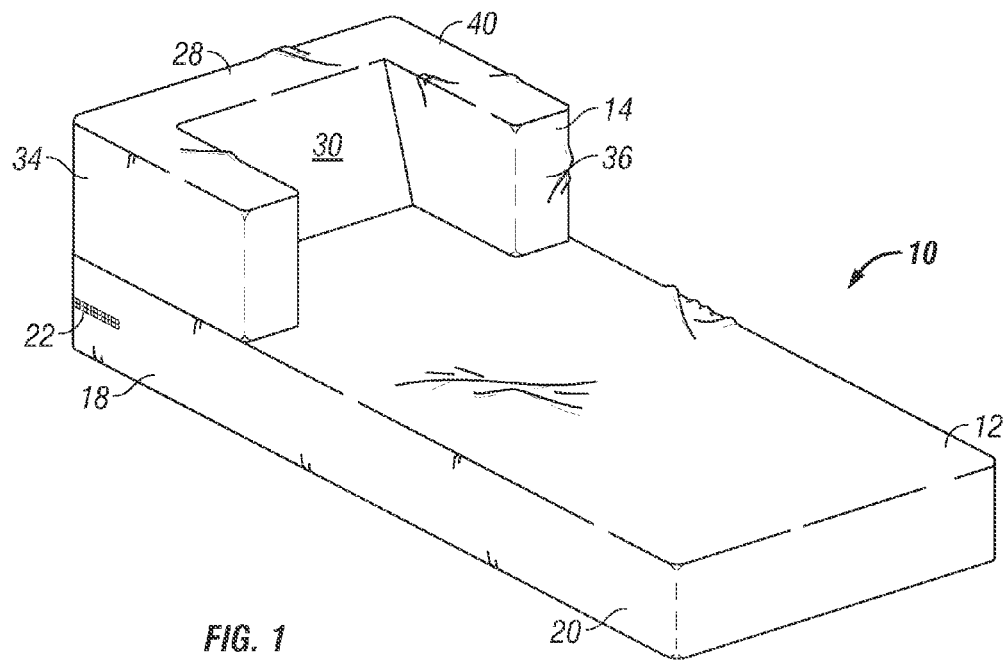
FIG. 1 is a frontal perspective view of a slip cover made in accordance with the present invention. The slip cover is shown with a mattress inside the mattress cover.

Turning now to the drawings in general and to FIGS. 1-4 in particular, there is shown therein a slip cover made in accordance with a preferred embodiment of the present invention and designated generally by the reference numeral 10. The slip cover 10 generally comprises a mattress cover 12 and a bolster 14.

Figure 4:
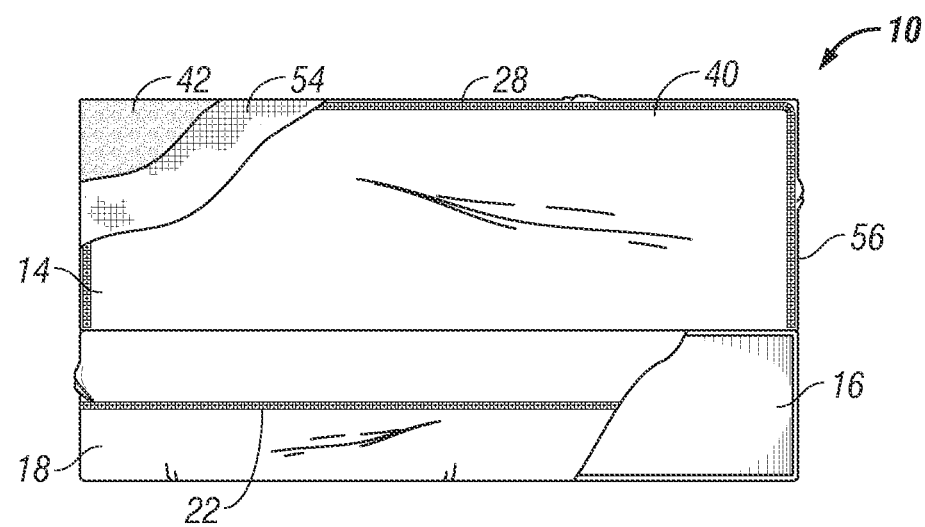
FIG. 4 is rear elevational view of the slip cover of FIG. 1. Portions of the bolster cover and the silk cushion enclosure are cut away to show the foam insert inside.

The mattress cover 12 is sized to fit a mattress 16 (FIG. 4 only). In the preferred practice of this invention, the mattress cover 12 is sized to fit a crib mattress so as to extend its useful life. However, the cover 12 could be sized to fit a twin mattress or other a mattress of another standard size. Still further, the mattress cover 12 could be customized to fit a non-standard mattress. In most instances, the cover 12 will be used with a foam or coil type mattress. However, the cover 12 may be used with an air mattress. For example, the cover 12 could be sold with its own inflatable mattress.

The mattress cover 12 includes an opening through which the mattress 16 is inserted. This opening may take any of several forms and may depend on the overall configuration of the cover 12. Preferably, the cover 12 will be configured to enclose the entire mattress. In some cases, however, it may be preferred that the cover 12 form a less than complete enclosure for the mattress. For example, the cover 12 could enclose just the top and sides of the mattress, in a manner similar to a fitted sheet with an elastic border.

As shown in FIGS. 1-4, where the mattress 16 (seen only in FIG. 4) is a standard crib mattress and the mattress cover 12 is sized to enclose it completely, the cover has first and second ends 18 and 20. In this embodiment, the opening for the mattress conveniently takes the form of a slot 22 across either one of the ends 18 and 20, such as the first or head end 18. Alternately, the slot could be formed in one of the long sides of the mattress cover 12. The opening may or may not include a closure, though in the embodiment shown herein, the slot 22 comprises a zippered closure. Other closures may used, such as a simple "sham style" overlapping edge, hook-and-loop fasteners, snaps, ties, hooks, buttons, and the like.

The bolster 14 is secured to the mattress cover 12. Preferably, the bolster 14 is permanently attached as by stitching to the cover 12 as this provides the simplest and most economical product. However, in some applications, it may be desirable to make the bolster 14 removable from the mattress cover 12, such as by hook-and-loop fasteners or another suitable manner.

The size and shape of the bolster 14 may vary, though in most embodiments the bolster will include at least an upright back section 28 extending upward a distance from the first end 18 of the cover 12. Although not essential, it is advantageous for the bolster 14 to extend across the entire end 18. Most preferably, the back section 28 will have an inclined front surface 30 to support comfortably the back of the user.

In the preferred embodiment, the bolster 14 has been secured to one of the short ends 18 of the elongate mattress. However, it will be understood that a longer bolster could provided on one of the longer sides of the mattress, providing a bolster similar to the type often used on day beds. The bolster 14 shown herein is positioned entirely on the top surface of the mattress; however, alternately, the bolster could be configured to surround one end of the mattress.

In some cases, the bolster 14 may simply be a back section 28. However, in most instances, a pair of arms 34 and 36 will be included, the arms extending forwardly and perpendicularly to the back section 28. The length of the arms 34 and 36 may vary, but usually the length of the arms will be less than half the length of the mattress.

The shape of the arms 34 and 36 may vary widely. As shown herein, the arms extend straightforwardly from the back section 28 and squared off when viewed from the side. However, as the slip cover 10 is intended for use with small children, the back 28 or arms 34 and 36, or both, may be provided with decorative or fanciful indicia. For example, the back and arms may be made in the shape of the upper body of a fanciful creature such as a bear or a hippopotamus. In this way, the friendly creature will appear to embrace the child leaning back in the slip cover 10.

Figure 2:
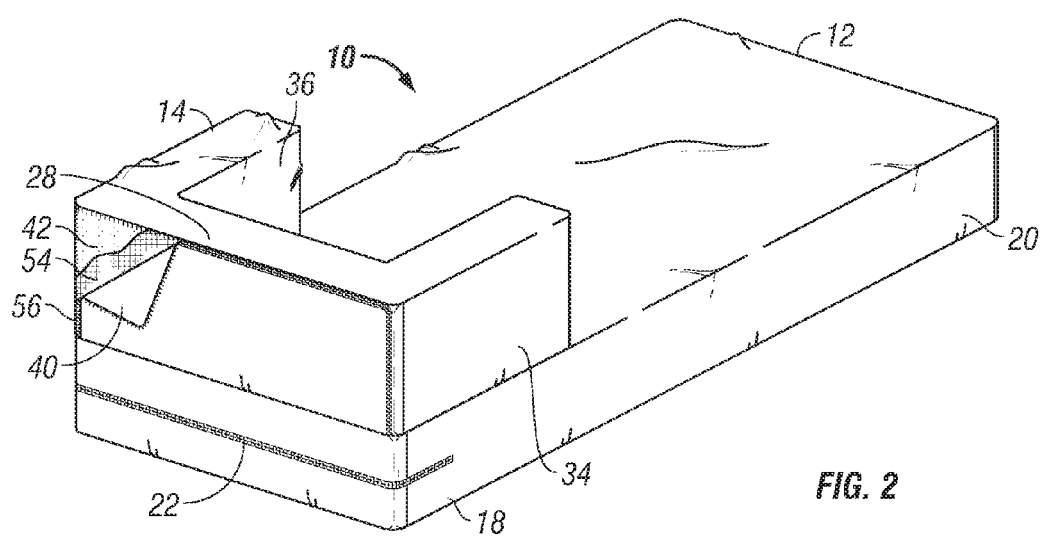
FIG. 2 is a rear perspective view of the slip cover of FIG. 1.
Figure 3:
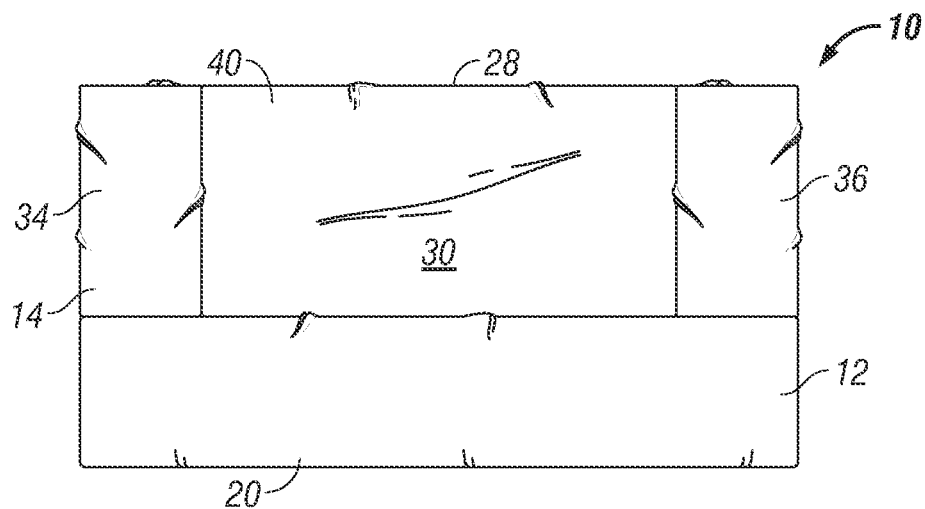
FIG. 3 is a front elevational view of the slip cover shown in FIG. 1.
Figure 5:
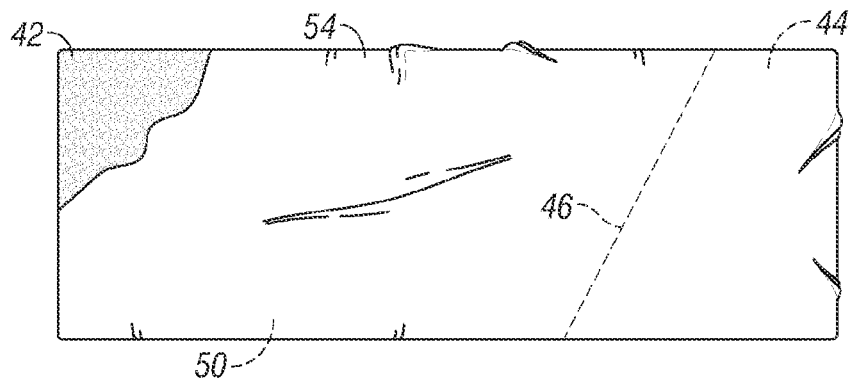
FIG. 5 is a side elevational view of the silk-enclosed foam insert. A portion of the silk enclosure is cut away to show the foam insert inside.
Figure 6:
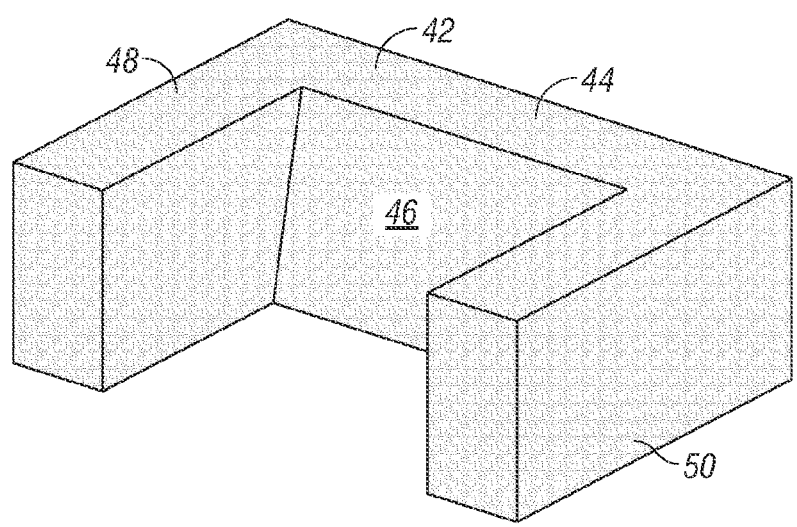
FIG. 6 is a frontal perspective view of the foam insert, showing the inclined back portion.

With continuing reference to FIG. 4 and turning now also to FIGS. 5 and 6, the preferred construction of the bolster 14 will be described. The bolster 14 preferably is formed of a bolster cover 40 and a filler of some type. For example, the filler may comprise an insert 42 formed of a solid block of polyurethane foam (FIG. 6) in the desired shape having a back section 44 with an included front surface 46 and arms 48 and 50 corresponding to the back section 28 and arms 34 and 36 of the bolster 14, as seen in FIGS. 1-3. The foam insert 42 ideally is enclosed in a fabric enclosure 54 made of silk or some other low friction material that will facilitate the insertion of the insert 42 inside the bolster cover 40. Other suitable fillers include down feathers, memory foam, and polystyrene pellets. Alternately, the insert could be an inflatable enclosure.

The bolster cover 40 should include an opening of some sort through which the insert 42 may be placed inside the cover. As seen best in FIG. 2, the opening takes the form of a zippered opening 56 around the rear of the back section 28. Other closures may used, such as hook-and-loop fasteners, snaps, ties, hooks, buttons, and the like.

The fabric of the mattress cover 12 and the bolster cover 40 may be any suitable fabric, but preferably is durable to withstand roughhousing by youngsters and multiple washings, substantial enough to protect the mattress inside, and finally comfortable for the users. Many appropriate polyester-cotton blends are commercially available and are suitable for bedding and juvenile furnishings. Other suitable fabrics include cotton flannel, and elastic fabrics, such as spandex or cotton-spandex blends. Still further, bamboo based fabrics, quilted fabrics, and new velvety plush polyesters may be used for the cover material. These fabrics are suggested as desirable, but the present invention is not limited to these.

Now it will be appreciated that the slip cover of the present invention provides extended and alternative uses for a crib mattress. The attached bolster creates a comfortable reading chaise for a toddler or young child. In addition, the slip covered mattress may serve as a portable toddler bed with the bolster creating bedside bumpers. Still further, the slip cover may be used as a dog bed, especially for large breed dogs or for multiple dogs in the family, even after the toddler has outgrown it.

The embodiments shown and described above are exemplary. Many details are often found in the art and, therefore, many such details are neither shown nor described. It is not claimed that all of the details, parts, elements, or steps described and shown were invented herein. Even though numerous characteristics and advantages of the present invention have been described in the drawings and accompanying text, the description is illustrative only. Changes may be made in the details, especially in matters of shape, size, and arrangement of the parts within the principles of the invention to the full extent indicated by the broad meaning of the terms of the attached claims. The description and drawings of the specific embodiments herein do not point out what an infringement of this patent would be, but rather provide an example of how to use and make the invention. The limits of the invention and the bounds of the patent protection are measured by and defined in the following claims.

What is claimed is:

1. A slip cover for a bed mattress that is rectangular in shape and is a standard mattress size, the slip cover comprising:
   a mattress cover that is rectangular in shape is configured to conform to the shape of the bed mattress, the mattress cover having a first end and a second end; and
   a bolster secured to the mattress cover, the bolster comprising at least a back section extending upward a distance from the first end of the mattress cover, wherein the bolster comprises a pair of arms extending forward from the back section.

2. The slip cover of claim 1 wherein the mattress cover is configured to enclose the entire mattress.

3. The slip cover of claim 2 wherein the mattress cover includes a slot through which the mattress is insertable.

4. The slip cover of claim 3 wherein the slot is positioned in one of the first and second ends of the mattress cover.

5. The slip cover of claim 4 wherein the slot is positioned in the first end of the mattress cover.

6. The slip cover of claim 5 wherein the slot comprises a zipper closure.

7. The slip cover of claim 1 wherein the bolster comprises a filler and a cover.

8. The slip cover of claim 7 wherein the filler comprises a solid foam insert.

9. The slip cover of claim 8 wherein the mattress has a length and wherein the arms have a length that is less than half the length of the mattress.

10. The slip cover of claim 7 wherein the bolster cover is permanently attached to the first end of the mattress cover.

11. The slip cover of claim 10 wherein the bolster comprises a solid foam insert and wherein the bolster cover includes an opening through which the foam insert is insertable.

12. The slip cover of claim 11 wherein the opening comprises a zipper.

13. The slip cover of claim 1 wherein the bolster comprises a cover and a solid foam U-shaped insert.

14. The slip cover of claim 1 wherein the mattress cover is configured to enclose the entire mattress, wherein the bolster comprises a cover and a solid foam U-shaped insert, and wherein the bolster cover is permanently attached to the first end of the mattress cover.

15. The slip cover of claim 1 wherein the mattress is further defined as a standard crib mattress or a standard twin mattress.

16. The slip cover of claim 1 wherein the mattress is further defined as a standard crib mattress.

17. A mattress assembly comprising:
   a bed mattress that is rectangular in shape and is a standard mattress size;
   a slip cover comprising:
      a mattress cover enclosing the mattress, the mattress cover being rectangular in shape and configured to conform to the shape of the mattress and having a first end and a second end; and
      a bolster secured to the mattress cover, the bolster comprising at least a back section extending upward a distance from the first end of the mattress cover, wherein the bolster further comprises a pair of arms extending forward from the back section.

18. The mattress assembly of claim 17 wherein the bed mattress has a length and wherein the arms have a length that is less than half the length of the mattress.

19. The mattress assembly of claim 18 wherein the bolster cover is permanently attached to the first end of the mattress cover.

20. The mattress assembly of claim 17 wherein the mattress cover is configured to enclose the entire mattress, wherein the bolster comprises a cover and a solid foam U-shaped insert, and wherein the bolster cover is permanently attached to the first end of the mattress cover.

21. The mattress assembly of claim 17 wherein the bed mattress is further defined as a standard crib mattress or a standard twin mattress.

22. The mattress assembly of claim 21 wherein the bed mattress is further defined as a standard crib mattress.

* * * * *

UNITED STATES PATENT AND TRADEMARK OFFICE
CERTIFICATE OF CORRECTION

| | | |
|---|---|---|
| PATENT NO. | : 8,661,588 B1 | Page 1 of 1 |
| APPLICATION NO. | : 11/946293 | |
| DATED | : March 4, 2014 | |
| INVENTOR(S) | : Jamie S. Leach | |

It is certified that error appears in the above-identified patent and that said Letters Patent is hereby corrected as shown below:

In the Specifications

Column 1, line 59: replace "other a mattress" with --other mattress--.

Column 2, line 16: replace "may use" with --may be used--.
Column 2, line 35: replace "could provided" with --could be provided--.

Column 3, line 9: replace "may used" with --may be used--.

Signed and Sealed this
Twenty-seventh Day of May, 2014

Michelle K. Lee
*Deputy Director of the United States Patent and Trademark Office*